Patented Jan. 30, 1934

1,945,131

UNITED STATES PATENT OFFICE 1,945,131

PRODUCTION OF ACETONE FROM ETHYL ALCOHOL

Grover Bloomfield, Lloyd C. Swallen, and Francis M. Crawford, Terre Haute, Ind., assignors to Commercial Solvents Corporation, Terre Haute, Ind., a corporation of Maryland No Drawing. Application January 9, 1930
Serial No. 419,737

8 Claims. (Cl. 260—134)

Our invention relates to a process of obtaining acetone from ethyl alcohol. More particularly, our invention relates to a process of obtaining acetone from ethyl alcohol at elevated temperatures and, preferably, reduced pressures in the presence of appropriate catalysts.

In a copending application, U. S. Serial No. 364,318, filed May 18, 1929, we have described a method of preparing acetone which consists essentially in subjecting ethyl alcohol at elevated temperatures and, preferably, at reduced pressures to the action of catalysts initially comprising difficultly reducible metal oxides, easily reducible metal oxides, and a metallic halide. We have now made the discovery that acetone may be obtained from ethyl alcohol by subjecting the latter to the action of catalysts comprising the oxygen compounds of metals of the first and second long periods of the periodic system.

The efficiency of catalysts of the above-mentioned character may be considerably increased by the use of auxiliary substances furthering the reaction, as for example, oxygen compounds of alkaline earth metals, including magnesium, such as calcium carbonate, calcium oxide, magnesium oxide and the like.

Below will be found a description of the composition and method of preparing a number of catalysts suitable for use in our new process. It is distinctly understood, however, that these examples are cited merely as illustrative of the character of the catalyst mixtures which we prefer to use and that we are in no way bound to the use of the examples cited. Many other combinations may also be satisfactorily employed in our process.

Example I 125 grams chromium nitrate
40 grams calcium acetate
96 grams ammonium carbonate The chromium nitrate and calcium acetate are dissolved in two liters of water. After warming to 50° C., the ammonium carbonate dissolved in 300 c. c. of water is added. After warming to 50°–60° C. for half an hour, the precipitate is filtered off, washed thoroughly on the filter, and dried in the air at room temperature. It is then broken up, screened to 8–14 mesh and used in this form.

Example II 52 grams manganese nitrate
64 grams magnesium nitrate
2 liters water
Precipitated with:
100 c. c. concentrated ammonium hydroxide
400 c. c. water The procedure was the same as described under Example I.

Example III 135 grams ferric nitrate
100 grams calcium acetate
2 liters water
Precipitated with:
150 grams anhydrous potassium carbonate
500 c. c. water The procedure is the same as that described under Example I except that after filtering the precipitate as dry as possible, it is worked up with about two liters of distilled water until free from lumps, warmed for about half an hour at 50–60° C., then filtered and washed as usual.

Example IV 61 grams cupric nitrate
64 grams magnesium nitrate
2 liters water
Precipitated with 45 c. c. of 10% sodium hydroxide solution. The procedure outlined under Example I is then followed.

When ethyl alcohol is passed at elevated temperature over suitable catalysts such as, for example, those described above, acetone is obtained together with certain other products, the character of which varies considerably depending upon the presence or absence of other materials with the ethyl alcohol being treated. We have found that in carrying out our new process it is not necessary that the ethyl alcohol be absolutely pure. Other substances which do not react with the ethyl alcohol or the acetone, or which do not react to form substances reacting in turn with these two compounds, may be present with the ethyl alcohol without producing appreciably harmful effects. In some cases, as will be seen hereafter, the presence of such materials may even produce beneficial results.

The catalytic conversion of ethyl alcohol to acetone is carried out with somewhat better results at pressures appreciably lower than atmospheric, than at ordinary pressures. Materials substantially inert under the conditions of the reaction may serve to lower the partial pressure of the ethyl alcohol being reacted, and thus accomplish the same result as if the reaction had been actually carried out under a partial vacuum.

The particular pressure to be employed in the conversion of ethyl alcohol to acetone depends to a large extent upon the economic considerations involved in the particular operation. For example, the pressure employed will depend upon the rate at which the alcohol is conducted over the catalyst, the volume of the catalyst used, the character of the catalyst used, the reaction temperature, cost of raw materials, methods of recovering both the unconverted alcohol and the acetone formed during the reaction, and finally, the method adopted for attaining reduced pressure.

We may employ any of a number of methods of conducting the alcohol over the catalyst under reduced pressure. These methods are equally satisfactory from the point of view of the efficacy of the reaction and the particular one adopted for use will depend upon the facilities available to the operator or the particular needs of a certain process. We may, for example, create a partial vacuum in the reaction chamber and introduce the alcohol to be reacted at such a rate as to maintain the desired reduced pressure in the reaction zone. The acetone thus formed and the unconverted alcohol are continually removed and recovered by any convenient method such as by condensing or by any suitable adsorption or solvent recovery process.

Another convenient method of attaining the desired reduced pressure is by mixing the ethyl alcohol with a material, inert under the conditions of the reaction, in sufficient quantity to reduce the partial pressure of the ethyl alcohol to the desired degree. Materials which we have found to be especially suitable for this purpose are, for example, nitrogen gas, carbon dioxide gas, hydrogen gas, or the gaseous products formed during the reaction. In case it is desired to employ the vapors of an inert liquid compound as the means of obtaining the desired pressure, it is highly advisable that the material chosen be miscible with ethyl alcohol, and preferably, easily vaporized. The mixture of ethyl alcohol vapor and vapor of the inert material may be passed directly over the heated catalyst, or, preferably, thru a preheater and then thru the heated catalyst. More accurately regulated mixtures of alcohol vapor and inert vapor—resulting in more accurately regulated partial pressure of the ethyl alcohol—may be obtained by vaporizing the alcohol and inert material in different vessels and later mixing the desired quantities of vapors of the two substances. When an uncondensable gas or a material in which the acetone is not soluble, is employed as the means of reducing the partial pressure of the alcohol being treated or when the reaction is carried out at reduced pressures without the aid of a diluent material such as has been enumerated, it is usually necessary to pass the gases issuing from the reaction chamber thru a scrubbing or solvent recovery system of some kind for the purpose of recovering the acetone.

A convenient and economical method of attaining the desired reduced pressure is by using as the inert diluent the gaseous reaction products formed in the process. The required proportion of these gaseous products, after removal of the acetone, unconverted alcohol and any other condensable product that may be formed by side reactions, condensation, scrubbing or other suitable method, and supplemented by additional inert material, if necessary, is mixed with alcohol vapor and again passed over the catalyst. In this way, the process may be carried out in a cyclic manner, the required partial pressure of the alcohol being maintained by purging at intervals or continuously, a portion of the gaseous reaction products, or, if necessary, making additions of gaseous inert material from an auxiliary source of supply. The mass action effect of these gaseous reaction products employed as diluents is apparently small since the conversion of alcohol to acetone is only slightly reduced by their use.

After a number of days use the catalyst begins to lose its efficiency and the rate of conversion of alcohol to acetone decreases appreciably. We have found, however, that the original efficiency of the catalyst may be easily and quickly restored. When the rate of conversion has decreased to a point beyond which the operation of the process is not economical, the operation may be stopped and the catalyst reactivated by passing over it oxygen or an oxygen-containing gas such as air, for a number of hours at temperatures of about 450°–600° C.

The table given below shows experimental results obtained with different catalysts and under different operating conditions.

| Alcohol | Catalyst | Grams alcohol per c.c. of | | Alcohol partial pressure mm. | Means of attaining partial pressure | Conversion to acetone* per cent |
|---|---|---|---|---|---|---|
| | | Cat. per hr. | Temp. °C. | | | |
| Ethyl | #1 | .13 | 500 | 25 | Nitrogen | 52 |
| Ethyl | #1 | .08 | 460 | 25 | Carbon dioxide | 86 |
| Ethyl | #2 | .16 | 500 | 23 | Carbon dioxide | 58 |
| Ethyl | #4 | .15 | 400 | 25 | Carbon dioxide | 69 |
| Ethyl | #4 | .38 | 450 | 40 | Gaseous reaction product. | 31 |
| Ethyl | #3 | .08 | 400 | 32 | Hydrogen | 60 |
| Ethyl | #3 | .15 | 400 | 55 | Vacuum (no diluent). | 90 |
| Ethyl | #3 | .30 | 400 | 55 | Vacuum (no diluent). | 76 |

*On basis of two mols of alcohol giving one mol of acetone.

The examples shown above are cited merely for the purpose of illustrating the varied conditions under which our new process may be satisfactorily operated, and it is distinctly understood that we are not limited by any of the conditions therein stated.

The reaction may be carried out over a fairly wide range of temperatures, say from about 250° C. to about 650° C. We prefer, however, to employ temperatures ranging from about 400° C. to about 500° C. This factor, of course, may be varied considerably depending upon the other factors such as volume of catalyst, rate of flow of alcohol vapor, pressure employed, method of attaining the desired pressure, etc.

The pressure at which the reaction is effected may also be varied over a wide range provided it is maintained appreciably below atmospheric pressure, the percentage of ethyl alcohol converted into acetone being increased as the pressure is decreased. We prefer, however, to make use of pressures ranging from about 10 mm. to about 250 mm. (mercury). It is understood, of course, that in this connection we use the terms "pressure" and "reduced pressure" as meaning also "partial pressure" in case the desired reduced pressure of the alcohol is attained by the use of an inert diluent instead of by the use of vacuum. We claim generally the process of effecting the herein described process at reduced pressures, and it is distinctly understood that we do not confine ourselves to any particular method of attaining the desired reduced pressures nor to any particular pressure. For example, we may either maintain a partial vacuum in the reaction vessel or we may attain the same result by diluting the alcohol vapor to be reacted with a sufficient amount of an inert material (under the conditions of the reaction) to reduce the partial pressure of the alcohol vapor to the desired degree. We prefer to make use of nitrogen or carbon dioxide gases for this purpose.

We have found that our new process may be satisfactorily carried out by the aid of a fairly wide variety of catalysts, and while we prefer to employ catalysts of the character described in this specification, it is distinctly understood that we do not confine ourselves to the use of only such materials.

Now having described our invention, what we claim as new and novel is:

1. A process for the production of acetone which comprises subjecting to the action of catalysts comprising essentially oxygen compounds of the metals of the first long period of the periodic table, at temperatures from 250° C. to 650° C., a gaseous mixture in which ethyl alcohol vapor is the only reactant present in substantial concentration and in which the pressure of said alcohol vapor is substantially lower than atmospheric.

2. A process for the production of acetone which comprises subjecting to the action of catalysts comprising essentially oxygen compounds of metals of the first long period of the periodic table, and of an auxiliary substance comprising an oxygen compound of an alkaline earth metal, at temperatures from 250° C. to 650° C., a gaseous mixture in which ethyl alcohol vapor is the only reactant present in substantial concentration and in which the pressure of said alcohol vapor is substantially lower than atmospheric.

3. A process for the production of acetone which comprises subjecting to the action of catalysts comprising essentially oxygen compounds of metals chosen from the group consisting of chromium, manganese, copper and iron, at temperatures from 250° C. to 650° C., a gaseous mixture in which ethyl alcohol vapor is the only reactant present in substantial concentration and in which the pressure of said alcohol vapor is substantially lower than atmospheric.

4. A process for the production of acetone which comprises subjecting to the action of catalysts comprising essentially oxygen compounds of metals chosen from the group consisting of chromium, manganese, copper and iron, and of an auxiliary substance comprising an oxygen compound of an alkaline earth metal, at temperatures from 250° C. to 650° C., a gaseous mixture in which ethyl alcohol vapor is the only reactant present in substantial concentration and in which the pressure of said alcohol vapor is substantially lower than atmospheric.

5. A process for the production of acetone which comprises subjecting substantially pure ethyl alcohol vapor to the action of catalysts comprising essentially oxygen compounds of the first long period of the periodic table, at temperatures from 250° C. to 650° C. and at subatmospheric pressures.

6. A process for the production of acetone which comprises subjecting substantially pure ethyl alcohol vapor to the action of catalysts comprising essentially oxygen compounds of the first long period of the periodic table, and of an auxiliary substance comprising an oxygen compound of an alkaline earth metal, at temperatures from 250° C. to 650° C. and at subatmospheric pressures.

7. A process for the production of acetone which comprises subjecting substantially pure ethyl alcohol vapor to the action of catalysts comprising essentially oxygen compounds of metals chosen from the group consisting of chromium, manganese, copper, and iron, at temperatures from 250° C. to 650° C. and at subatmospheric pressure.

8. A process for the production of acetone which comprises subjecting substantially pure ethyl alcohol vapor to the action of catalysts comprising essentially oxygen compounds of metals chosen from the group consisting of chromium, manganese, copper, and iron and of an auxiliary substance comprising an oxygen compound of an alkaline earth metal, at temperatures from 250° C. to 650° C. and at subatmospheric pressure.

GROVER BLOOMFIELD.
LLOYD C. SWALLEN.
FRANCIS M. CRAWFORD.

CERTIFICATE OF CORRECTION.

Patent No. 1,945,131. January 30, 1934.

GROVER BLOOMFIELD, ET AL.

It is hereby certified that error appears in the printed specification of the above numbered patent requiring correction as follows: Page 2, column 2, in the heading of the table the words "Grams alcohol per c c of" erroneously appear over columns 3 and 4, whereas they should appear only over column 3. The heading for column 3, in the table should read Grams alcohol per c c of Cat. per hr.; and that the said Letters Patent should be read with this correction therein that the same may conform to the record of the case in the Patent Office.

Signed and sealed this 3rd day of April, A. D. 1934.

F. M. Hopkins (Seal)

Acting Commissioner of Patents.